Oct. 14, 1969 R. B. RHOADES 3,472,516

RECORD CHANGER APPARATUS FOR RECORDING AND REPRODUCING FROM A MAGNETIC SHEET

Original Filed May 13, 1963 6 Sheets-Sheet 1

INVENTOR.
Robert B. Rhoades
BY
Brown Jackson Boettcher + Dienner
Att'ys.

INVENTOR
Robert B. Rhoades
BY
Brown Jackson Boettcher & Dienner
Att'ys.

INVENTOR.
Robert B. Rhoades
BY
Brown Jackson Boettcher & Dienner
Attys.

INVENTOR.
Robert B. Rhoades
BY
Brown Jackson Boettcher & Dienner
Attys.

INVENTOR.
Robert B. Rhoades
BY
Brown Jackson Boettcher & Dienner
Att'ys

Oct. 14, 1969 R. B. RHOADES 3,472,516

RECORD CHANGER APPARATUS FOR RECORDING AND REPRODUCING FROM A MAGNETIC SHEET

Original Filed May 13, 1963 6 Sheets-Sheet 6

INVENTOR.
Robert B. Rhoades
BY
Brown Jackson Boettcher & Dienner
Attys

United States Patent Office 3,472,516

Patented Oct. 14, 1969

3,472,516

RECORD CHANGER APPARATUS FOR RECORDING AND REPRODUCING FROM A MAGNETIC SHEET

Robert B. Rhoades, St. Joseph, Mich., assignor to V-M Corporation, Benton Harbor, Mich., a corporation of Michigan Original application May 13, 1963, Ser. No. 279,955. Divided and this application Nov. 16, 1966, Ser. No. 594,850

Int. Cl. G11b *5/00*

U.S. Cl. 274—4 16 Claims

ABSTRACT OF THE DISCLOSURE

Magnetic sheet recorder player wherein sheets are automatically fed into a closed path for transverse scanning by the transducer head as the sheet is rotated in said path and automatically discharged at the end of play and/or record. A sprocket driven by its engagement with a sheet in the closed path moves the head transversely from one side of the sheet to the other until a cam is actuated by engagement of means on the head which opens the gate allowing discharge of the sheet from said closed path. A senser positioned to engage a sheet in the closed path actuates a rocker when the sheet is discharged to shift the drive of the head from a low speed feed screw driven by the sprocket to a motor driven spiral which returns the head to its starting position at a much faster rate.

This application is a division of my pending application Ser. No. 279,955, filed May 13, 1963, and relates to record changer apparatus for recording and reproducing from a magnetic sheet. More specifically, the present invention relates to a magnetic recording and reproducing apparatus for use with a recording medium comprising a sheet on which a sound track may be recorded, the sheet normally being flat and being deformable into an arcuate shape for the purpose of recording thereon or reproducing therefrom.

Conventional magnetic recording and reproducing apparatus is adapted for use with a magnetic medium in the form of a tape. The tape normally is stored on a reel and is played on a machine adapted to pass the tape over a magnetic recording or reproducing head and store the tape on a second reel. After the tape has been recorded or reproduced, the machine is adapted to rewind the tape on its original storage reel for subsequent playing.

Because of the fact that reels of tape are relatively difficult to store as compared with disc records, mechanisms have not been developed for continuously and automatically playing one tape after another as is conventional in connection with the playing of disc records. Accordingly, it is necessary in conventional tape recorders and reproducers to manually shift reels of tape after the playing thereof. Thus, the total length of automatic playing time is determined by the total time required for the playing of one reel.

A magnetic recorder-reproducer device for handling a magnetic medium in the form of a flat sheet is described in the copending application of James L. D. Morrison and Michael H. Estkowski, Ser. No. 253,894, filed Jan. 25, 1963, which issued Nov. 16, 1965, as United States Patent No. 3,218,077, and is assigned to the assignee of the present invention. The present invention comprises various improvements over the structure disclosed in the aforementioned patent, which improvements relate generally to mechanism for automatically feeding magnetic sheets one at a time into the reproducer device and ejecting sheets therefrom, and mechanism for controlling the travel of a magnetic head across a sheet for reproducing sound therefrom and for returning the head to its original position after the playing of the sheet has been terminated.

Accordingly, one object of the present invention is to provide, in combination, a reproducing apparatus and an associated changer mechanism for handling a magnetic medium in the form of a flat sheet whereby a plurality of magnetic sheets may be fed into the reproducer apparatus one at a time for playing, and upon the termination of the playing of a sheet the latter will be automatically ejected from the reproducing apparatus and a new sheet automatically delivered thereto.

A further object of the invention is to provide changer mechanism as above mentioned which operates automatically to simultaneously eject one sheet from an associated reproducing device while it feeds a new sheet thereto.

An additional one of my objects is to provide a changer mechanism of the foregoing type which is responsive to sheet-sensing means which senses the presence of a sheet in operative position within the associated reproducing device, whereby when the sheet-sensing means determines that that sheet in the reproducing apparatus is no longer in operative position therein and thus the playing of the sheet has been terminated, the changer mechanism is automatically actuated to eject the played sheet and feed a new sheet into the apparatus.

Another object of the present invention is to provide a gate or the like adjacent the path of travel of a sheet in the reproducing apparatus which gate is normally closed and which when opened will permit a sheet to be ejected therethrough, and to provide in conjunction therewith means for automatically opening the gate when the magnetic head has reached the end of its path of travel across a sheet.

Still another object of the invention is to provide head driving means comprising first means for moving the head transversely across the sheet at a first predetermined rate for reproducing the sheet and second means for moving the head in the opposite direction at an increased rate of speed for returning the same to its original position.

A further object of the invention is to provide drive means as last above-mentioned in conjunction with sheet-sensing means, and also follower means for operatively connecting the magnetic head assembly to either the first or the second drive means, whereby when the sheet-sensing means determines the presence of a sheet in the reproducing device in operative position to be played the follower means will automatically be connected with the first drive means, and when the sheet-sensing means determines that there is no sheet in such operative position the follower means will automatically be connected with the second drive means to return the head assembly to its original position.

Other advantages and uses of my invention will be apparent, or become so, as I describe the invention in greater detail in conjunction with the accompanying drawings in which.

Figure 5:
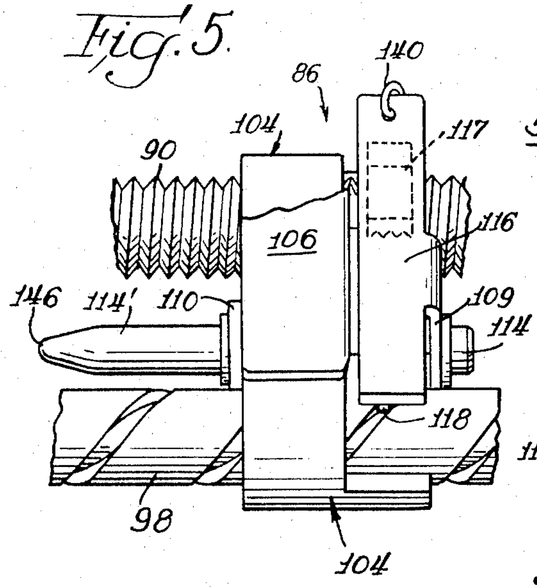
Figure 4:
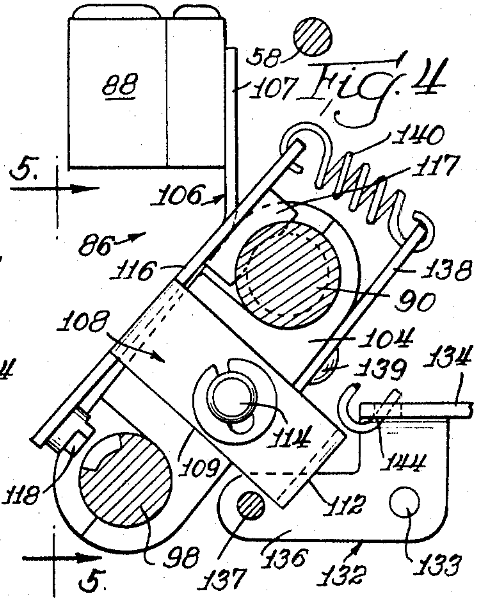
FIGURE 4 is an enlarged fragmentary sectional view taken substantially along the line 4—4 of FIGURE 3 illustrating the mounting of a magnetic recording head assembly in conjunction with a worm member for driving the head transversely across a sheet and a spiral member having a greater pitch than the worm member for returning the head, and further illustrating follower means for operatively coupling the head assembly either to the worm member or the spiral member.
Figure 3:
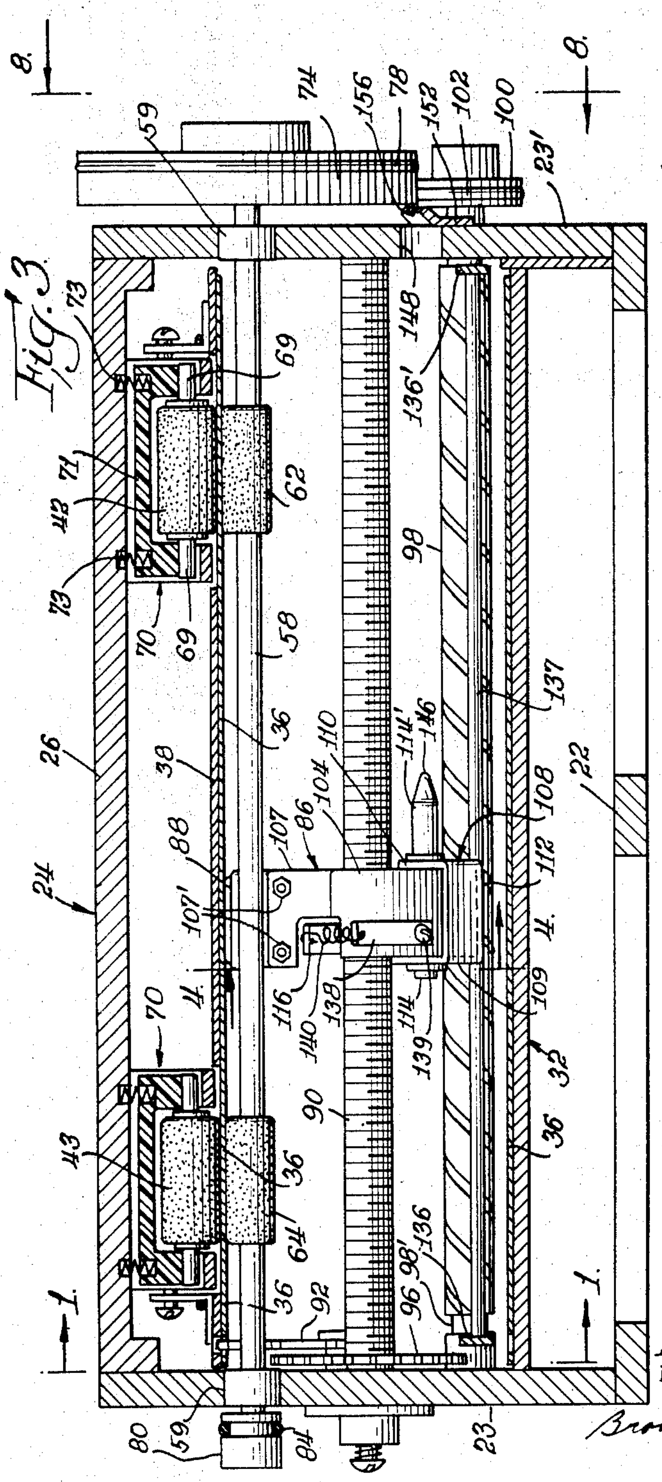
FIGURE 3 is a vertical section taken substantially along the line 3—3 of FIGURE 1.
Figure 6:
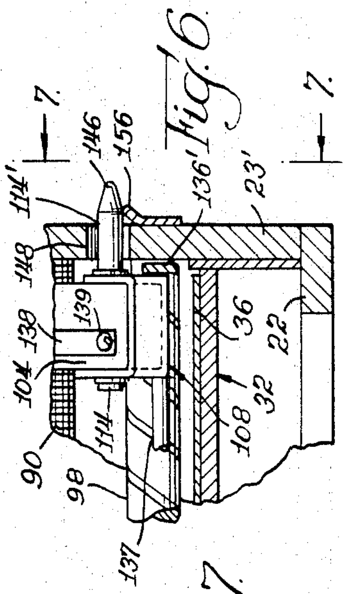
Figure 7:
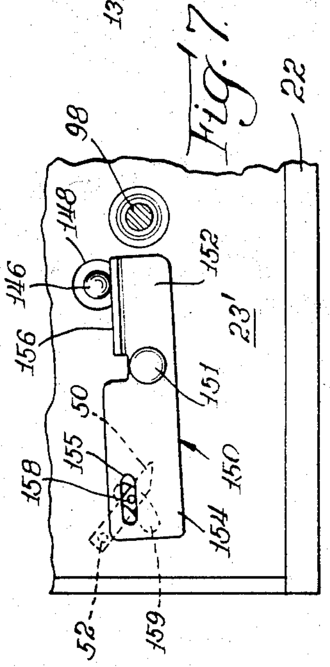
Figure 8:
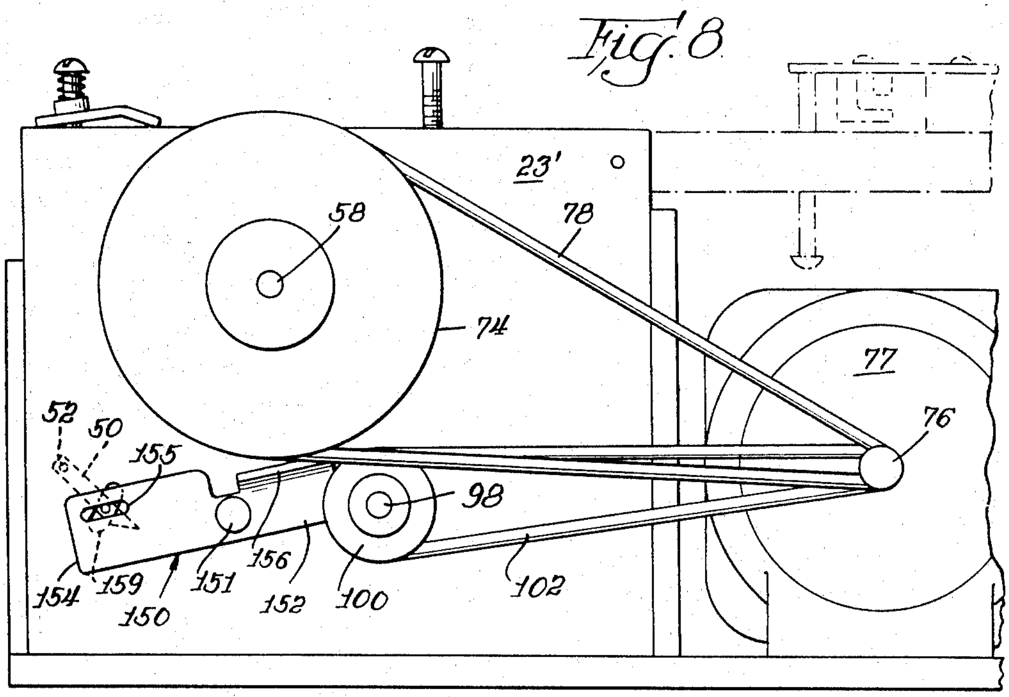
Figure 10:
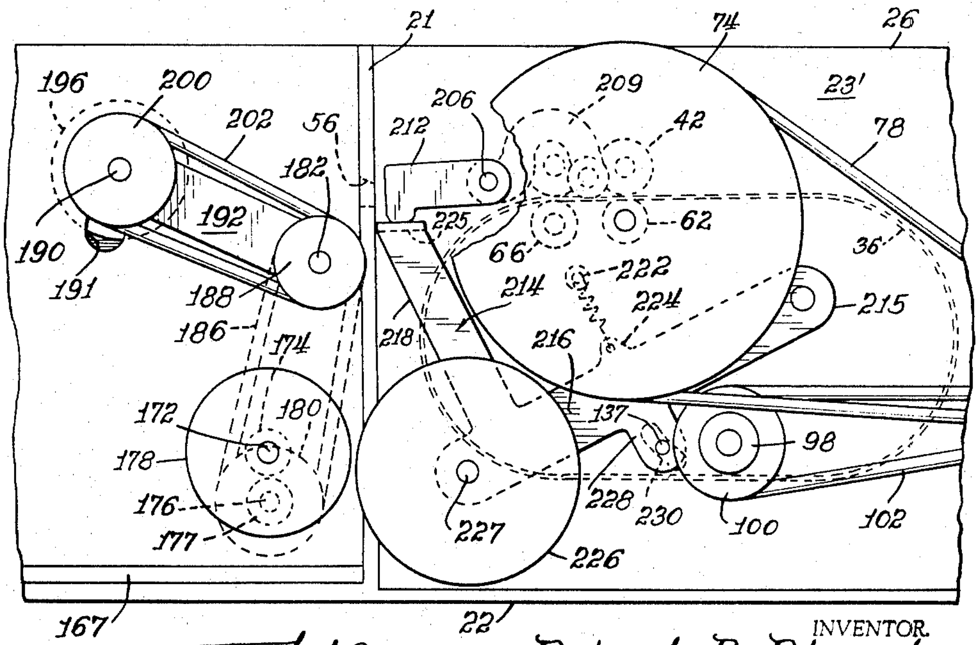
Figure 9:
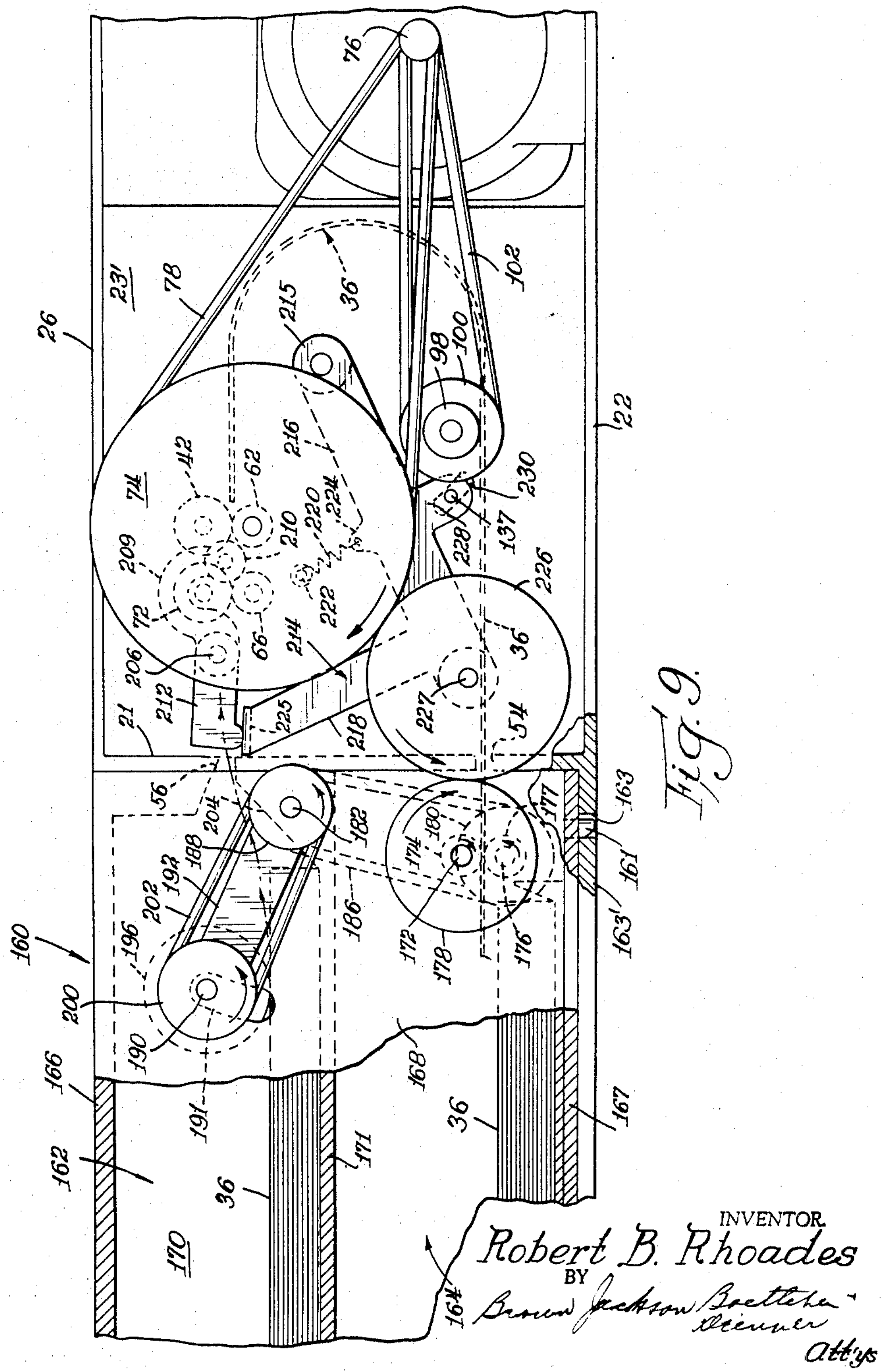
Figure 11:
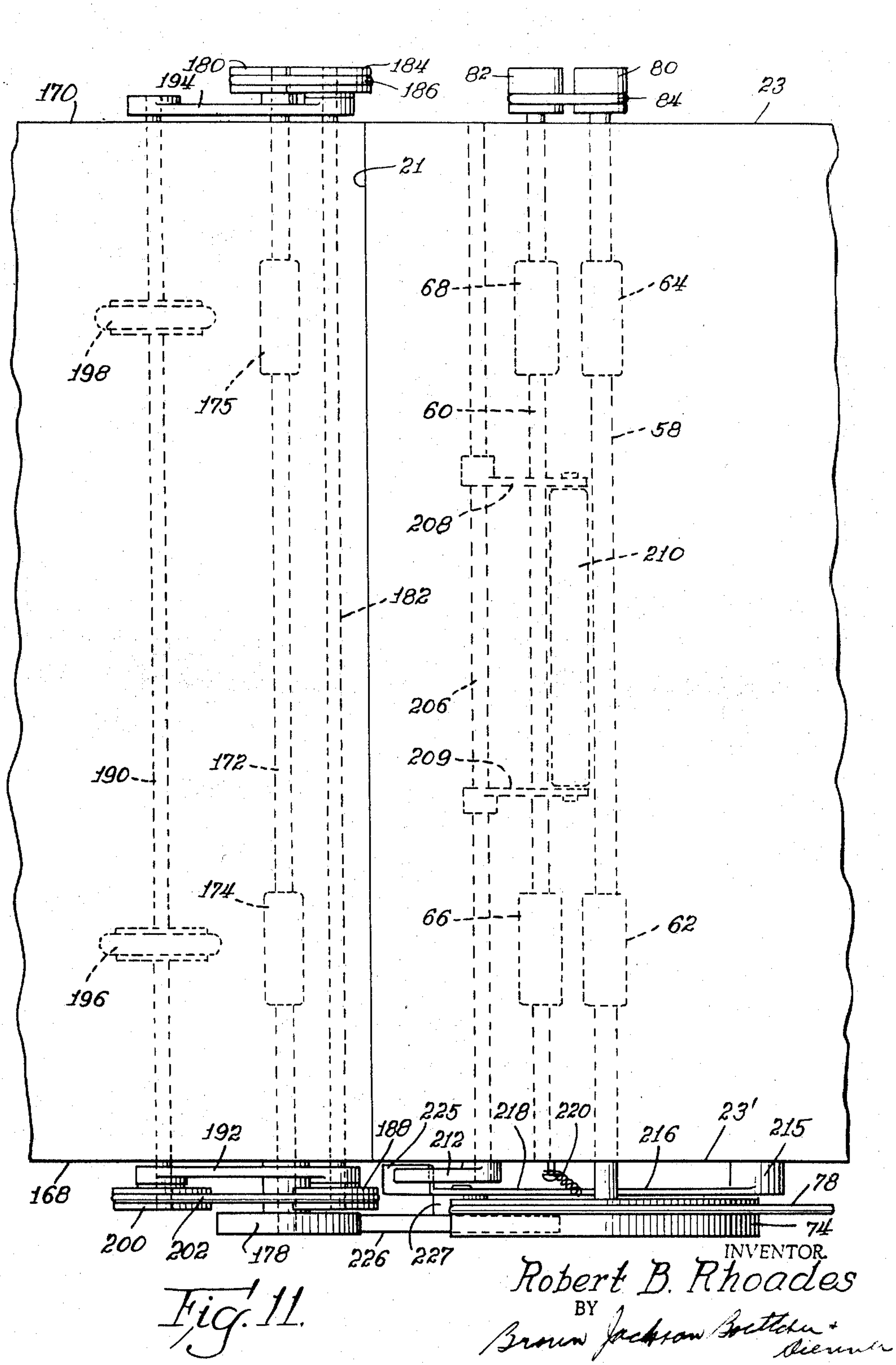

FIGURE 5 is a fragmentary elevational view looking substantially in the direction of the arrows 5—5 of FIGURE 4;

FIGURE 6 is a fragmentary sectional view comprising substantially the lower right hand portion of FIGURE 3 illustrating the magnetic recording and reproducing head in its extreme right hand position after completely traversing a sheet, and further illustrating mechanism for automatically opening a gate to permit ejection of the sheet from the apparatus;

FIGURE 7 is a fragmentary elevational view looking substantially in the direction of the arrows 7—7 of FIGURE 6;

FIGURE 8 is an end elevational view, partly broken away, looking substantially in the direction of the arrows 8—8 of FIGURE 3;

FIGURE 9 is an end elevational view, partly broken away, showing an alternative embodiment of the recording and reproducing apparatus of the present invention wherein a sheet-sensing member is disposed adjacent the exterior of the sheet, and there is shown in conjunction with such apparatus an automatic sheet changer mechanism for feeding a plurality of sheets seriatim to the recording and reproducing apparatus and for ejecting a sheet therefrom, the outer wall of the latter mechanism being partly broken away to better illustrate the sheet storage compartments of the changer;

FIGURE 10 is a fragmentary and elevational view similar to FIGURE 9 showing the relative positions of the sheet drive components when a sheet is operatively positioned within the recording and reproducing apparatus and the drive for the changer mechanism is thereby rendered inoperative; and FIGURE 11 is a top plan view, partly broken away, of the apparatus of FIGURE 9.

Figure 1:
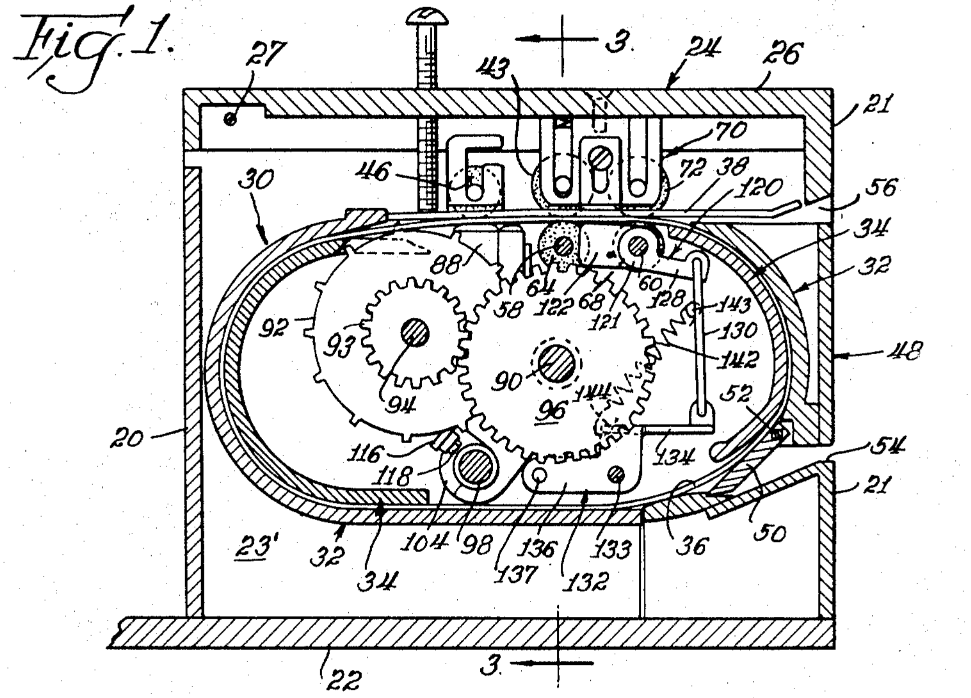
FIGURE 1 is a vertical section taken substantially along the line 1—1 of FIGURE 3 illustrating magnetic recording and reproducing apparatus constructed in accordance with the present invention.
Figure 2:
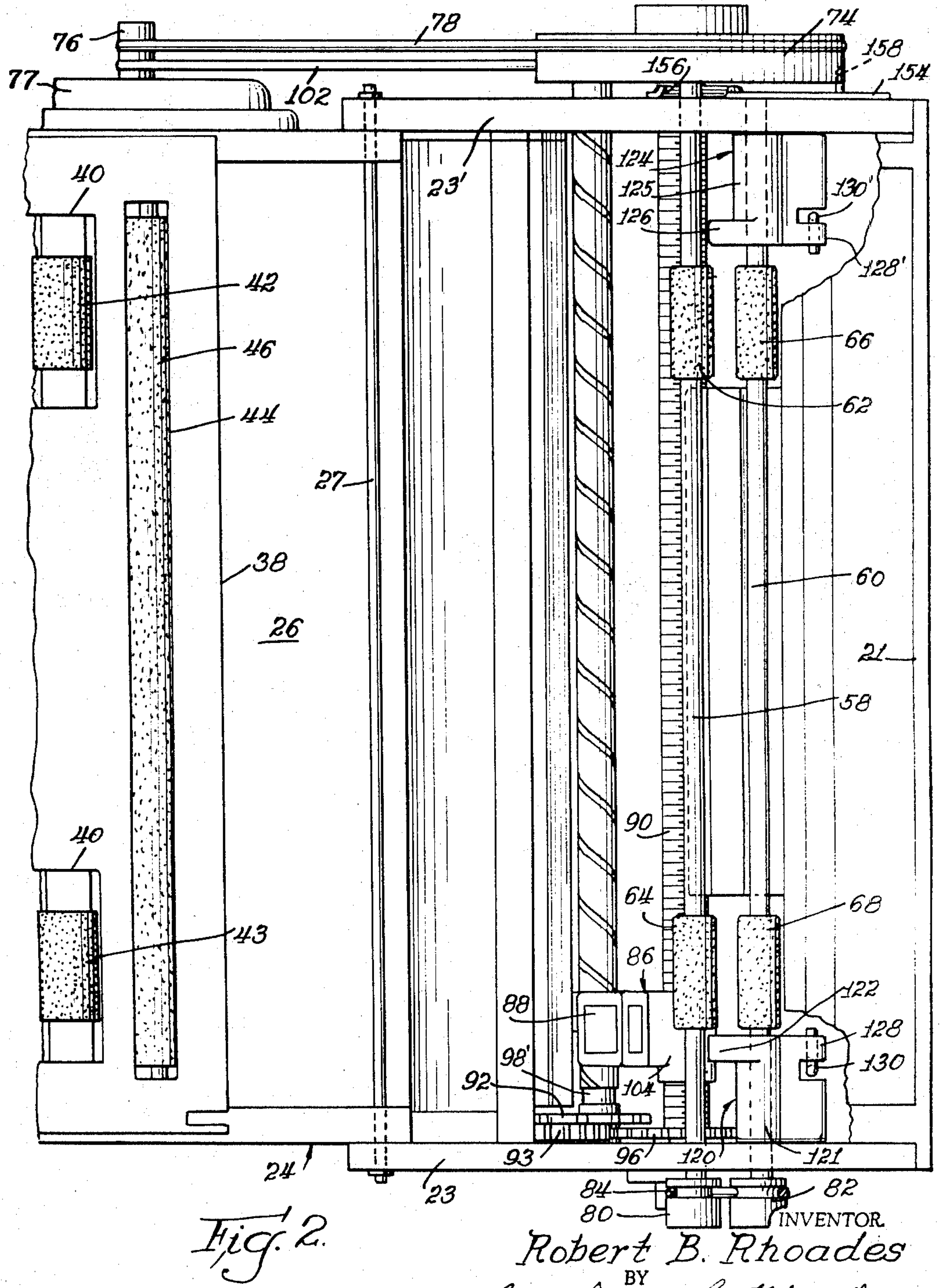
FIGURE 2 is a top plan view of the recording and reproducing apparatus of FIGURE 1 with the upper portion thereof pivoted to an open position to better illustrate the sheet driving components housed in the lower portion of the apparatus and the corresponding pressure rollers and the like housed in the pivotable upper portion.

Referring now to the drawings, FIGURE 1 shows a housing comprising a pair of side walls 20 and 21, a bottom wall 22, and a pair of end walls 23 and 23'. An upper portion 24 of the apparatus including a top wall 26 and certain components carried thereon (which will be described more fully hereinafter) is pivotally mounted to the end walls 23 by a pivot pin 27 (shown best in FIGURE 2) so that the upper portion of the device may be swung open as shown in FIGURE 2 in order to permit access to the interior thereof. A sheet guide indicated generally at 30 in FIGURE 1 comprises an outer stationary guide wall 32 and an inner stationary guide wall 34. The walls 32 and 34 are spaced from one another and in the embodiment shown they comprise generally semi-circular end portions and substantially flat parallel intermediate portions so as to define a convolute path of travel for a record sheet 36.

In the particular embodiment illustrated, the guide walls 32 and 34 are not continuous, but it will be understood that they may be substantially continuous except for openings to permit insertion and removal of a sheet and openings to permit friction drive rollers and pressure or back-up rollers to engage the sheet. As shown in FIGURES 1–3, the upper intermediate portion of the outer guide wall 32 is comprised of a substantially flat plate 38 which is carried by the upper portion 24 of the apparatus and which is provided with openings for accommodating a plurality of pressure rollers. For example, FIGURE 2 shows a pair of openings 40 for a corresponding pair of pressure rollers 42 and 43, and an elongated opening 44 for a pressure roller 46 which extends across the major portion of the length of the reproducing apparatus. It will also be noted in FIGURE 1 that a section 48 of the housing including portions of the guide walls 32 and 34 is formed as a separate integral piece which is removable to permit more complete access to the interior components of the device.

The section 48 of the housing carries a gate 50 which is pivotally mounted by pin means 52 at each end thereof. The gate 50 is shown in FIGURE 1 in its counterclockwise or closed position wherein it forms in effect a continuation of the outer guide wall 32, and the gate is pivotable a short distance in a clockwise direction to an open position whereby a sheet 36 which is travelling through the guide 30 in a counterclockwise direction will be ejected through the opening thus formed in the outer guide wall 32. The side wall 21 of the housing portion 48 has an opening 54 which extends substantially the full length of the apparatus to permit a sheet 36 to pass out therethrough. The aforementioned side wall 21 also has a similar opening 56 which is disposed above the openings 54 and which permits insertion of a sheet 36 into the reproducing apparatus.

FIGURE 2 shows a pair of parallel shafts 58 and 60 which are journalled at their ends in bearings 59 (see FIGURE 3) disposed within the end walls 23 and 23' of the housing. The shaft 58 has a pair of rubber rollers 62 and 64 fixedly mounted thereon in spaced relation, and the shaft 60 carries a pair of rollers 66 and 68 in similar fashion. As shown in FIGURE 1, a supporting bracket 70 is secured to the underside of the pivotable top wall 26 of the housing, and the pressure roller 43 is carried by the bracket and positioned so as to bear against the roller 64 when the upper portion 24 of the apparatus is in closed position. In a similar manner, a pressure roller 72 is carried by the bracket 70 for engagement with the lower roller 68, and similar pressure rollers are carried by the top housing portion 24 for engagement with the lower drive rollers 62 and 66.

The four pressure rollers carried in the top housing portion may be spring loaded toward the corresponding drive rollers, and the elongated pressure roller 46 is also preferably spring loaded. By way of example, FIGURE 3 shows the manner in which the pressure rollers 42 and 43 are urged downwardly against the corresponding drive rollers 62 and 64. Thus, an axle 69 projects from each end of the roller 42, and a vertically movable bracket portion 71 engages the ends of the axle so as to bear downwardly thereon. A pair of compression springs 73 are disposed between the bracket portion 71 and the housing top wall 26 to spring load the roller 42 toward the drive roller 62. Similar mechanism is shown in FIGURE 3 for spring loading the pressure roller 43 toward the drive roller 64.

Referring to FIGURES 2 and 8, a flywheel 74 is mounted on one end of the shaft 58, and the flywheel is driven from a drive pulley 76 of a motor 77 by means of an O-ring type belt 78. At the opposite end of the shaft 58 a small pulley 80 is mounted, and adjacent thereto a pulley 82 is mounted on the end of the shaft 60. An O-ring type belt 84 is extended over the pulleys 80 and 82 so that the pulley 82 is driven from the pulley 80. The diameter of the belt groove formed on the pulley 82 is somewhat less than that for the pulley 80, and the first-mentioned groove is generally semi-circular in cross section whereas the groove in the pulley 80 is flat at its base. Accordingly, the shaft 60 will be driven at a greater speed than the shaft 58, and the purpose of such an arrangement is to cause the rollers 66 and 68 to feed the leading edge of a sheet 36 into abutment with the trailing edge thereof and thus minimize the sheet gap as the latter passes under a recording head. When the gap is thus closed, the belt 84 will slip on the pulley 82 and the shafts 58 and 60 will thereafter be driven at the same speed. The operation of the catch-up rollers 66 and 68 is described more fully in my assignee's copending application Ser. No. 195,665, now United States Patent No. 3,235,265.

FIGURES 1–3 show a magnetic head assembly 86 including a magnetic head member 88, and the head assembly is carried on a feed screw 90 whereby the feed screw is adapted to move the head 88 transversely across the inside of a sheet 36 for recording thereon or reproducing therefrom, such movement being from left to right as viewed in FIGURE 3. A sprocket wheel 92 has a smaller diameter pinion 93 secured to the outer side thereof and the sprocket wheel assembly is rotatably mounted at the inside of the housing end wall 23 by means of a pin 94. The sprocket wheel 92 is positioned adjacent the path of travel of the sheet 36 and is adapted to engage in a plurality of sprocket holes formed in the sheet (shown best in FIGURE 3) whereby when the sheet is driven through the guide 30 by means of the drive rollers 62 and 64 the movement of the sheet will drive the sprocket wheel 92 and pinion 93. The pinion 93 meshes with a gear wheel 96 (see FIGURE 1) which is carried on the end of the feed screw 90 so as to drive the feed screw and thereby cause the head assembly 86 to traverse the sheet. It will thus be seen that the sheet itself drives the head so as to coordinate movement of the head across the sheet with movement of the sheet through the guide 30. The elongated spring loaded pressure roller 46 is disposed adjacent the path of the head 88 so as to press the sheet 36 against the head regardless of the position of the latter.

It will now be understood from FIGURE 1 that a flat sheet 36 may be inserted into the reproducing apparatus through the openings 56 in the housing side wall 21 until the leading edge of the sheet is disposed between the catch-up rollers 66 and 68 and the corresponding pressure rollers 72. The rollers 66 and 68 feed the sheet in between the drive rollers 62 and 64 and the corresponding pressure rollers 42 and 43 and the sheet is driven through the guide 30 in a convolute path which in the embodiment described is somewhat ovate in its configuration. The sheet thus passes continuously between the outer and inner guide walls 32 and 34, and the catch-up rollers 66 and 68 butt the leading and trailing edges of the sheet as the sheet gap passes over the head 88. The sheet 36 drives the feed screw 90 in the manner previously described and thus the head assembly 86 is fed across the sheet from its initial position substantially as shown in FIGURE 2 to the opposite end of the feed screw. When it is desired to eject the sheet 36 from the reproducing apparatus, the gate 50 is pivoted slightly toward its clockwise position and the sheet is driven out the opening thus provided in the outer guide wall 32 so that it can be removed through the opening 54 in the side wall 21.

Head return mechanism

FIGURES 1–5 show a spiral shaft 98 the ends of which are journalled in bearings provided in the housing side walls 23 and 23'. A pulley 100 is mounted at one end of the spiral (see FIGURES 3 and 8) and the motor pulley 76 is adapted to continuously drive the spiral through an O-ring type belt 102. The spiral 98 is for the purpose of returning the head assembly 86 to its original position after the playing of a sheet has been terminated. The spiral is therefore rotated opposite to the direction of the feed screw 90, and it is formed with a larger pitch so as to provide a substantially faster lead than the feed screw.

FIGURE 4 shows a mounting block 104 which is somewhat ovate in cross sectional configuration and which has a pair of cylindrical openings for accommodating the feed screw 90 and the return spiral 98 respectively. Thus, the block 104 is mounted on the feed screw and the return spiral so as to be adapted to slide thereon. A bracket 106 is secured to the block 104 by screw fasteners or the like (not shown) and an upwardly bent leg 107 of the bracket has the magnetic head 88 secured thereto by a pair of screws 107' (see FIGURE 3).

A generally U-shaped bracket 108 (see FIGURES 3, 4 and 5) comprises a pair of legs 109 and 110 which straddle the sides of the mounting block 104 and which are connected by a bight portion 112. The U-shaped bracket 108 is pivotally mounted on the block 104 by a pivot pin 114 which extends through the block and through the bracket legs 109 and 110. The bracket leg 109 has integral therewith a follower plate 116 which is generally parallel to the face of the block 104 and is of sufficient length to overlie both the feed screw 90 and the return spiral 98. The follower 116 has a depending tooth or the like 117 at one end thereof which extends toward the feed screw 90 and is adapted to operatively engage the screw to provide a driving connection between the head assembly 86 and the feed screw. Similarly, the follower 116 carries a depending tooth 118 at its opposite end which extends toward the return spiral 98 and is adapted to operatively engage the same to provide a driving connection between the head assembly and the spiral.

It will now be understood that the follower 116 is pivotal about the pin 114 and when the follower is pivoted in a clockwise direction as viewed in FIGURE 4 the tooth 117 on the follower will be engaged with the feed screw 90 and the tooth 118 will be disengaged from the return spiral 98. Similarly, when the follower is pivoted in a counterclockwise direction the tooth 118 will be engaged with the return spiral 98 and the tooth 117 will be disengaged from the feed screw 90. As previously described, the feed screw 90 is driven whenever a sheet 36 is being fed through the reproducing apparatus, and the return spiral 98 is continuously driven by the motor pulley 76 whenever the latter is operating. Thus, under such conditions, if the follower 116 is moved to its clockwise position, the head 88 will be fed transversely across the sheet from left to right as viewed in FIGURE 3 for playing the sheet, and whenever the follower is moved to its counterclockwise position the head will be moved transversely in the opposite direction at an increased rate of speed due to the faster lead on the return spiral 98. At the far left hand end of the return spiral 98 (as viewed in FIGURE 3) an idle groove 98' is provided so that the head 88 will be returned to its original position and will then wait until the follower 116 is pivoted in order to again feed the head across the sheet.

FIGURE 2 shows a sheet-sensing member 120 which is pivotally carried on the shaft 60 between the roller 68 and the housing end wall 23. The member 120 comprises a generally tubular body portion 121 and an integral rearwardly projecting finger portion 122. A similar sheet-sensing member 124 having a body portion 125 and an integral finger 126 is carried on the opposite end of the shaft 60 between the roller 66 and the housing end wall 23'. FIGURE 1 shows the sheet-sensing member 120 and related mechanism in elevation and it will be seen that it further comprises a forwardly projecting arm 128 which has connected therto the upper end of a generally vertical link 130. A bellcrank 132 is pivotally mounted to the housing end wall 23 by a pivot pin 133. The bellcrank 132 includes a forwardly projecting arm 134 which is connected to the lower end of the link 130, and a rearwardly projecting arm 136 which carries one end of an actuating rod 137. The actuating rod 137 extends substantially the full length of the reproducing apparatus (as best shown in FIGURE 3), and it will be understood that mechanism similar to the bellcrank 132 and the link 130 is associated with the oppositely disposed sheet-sensing member 124 for controlling the other end of the rod 137.

FIGURE 4 shows the manner in which the rod 137 controls the position of the follower 116. Thus, an arm 138 is fixed to the head mounting block 104 by fastening means 139, and a tension spring 140 is connected between one end of the follower 116 and the end of the arm 138 so as to bias the follower toward its clockwise position wherein the head assembly 86 is adapted to be driven by the feed screw 90. However, when the bellcrank 132 is pivoted in a clockwise direction, the rod 137 will engage the lower end of the U-shaped bracket 108 and will pivot the latter in a counterclockwise direction thus moving the follower 116 to its counterclockwise position wherein the head assembly 86 is adapted to be driven by the return spiral 98. It will be noted that because the actuating rod 137 extends the full length of the reproducing apparatus, it will be adapted to cooperate with the U-shaped bracket 108 regardless of the transverse position of the head assembly 86.

There is shown in FIGURE 1 a tension spring 142 having one end connected to a fixed stud 143 which projects the housing end wall 23 and its other end connected to the bellcrank 132 at 144 so as to bias the bellcrank in a clockwise direction and thereby bias the actuating rod 137 upwardly into engagement with the U-shaped bracket 108. However, it will be seen that the finger 122 of the sheet-sensing member 120 is disposed immediately beneath the path of travel of the sheet 36 and in the absence of a sheet in the apparatus the spirng 142 will cause the finger 122 to project upwardly into the path of the sheet. When a sheet is inserted into the apparatus it will thus engage the finger 122 and move the latter downwardly, in which case the sheet-sensing member 120 will be pivoted in a counterclockwise direction and will act through the link 130 to pivot the bellcrank 132 in a counterclockwise direction to disengage the actuating rod 137 from the U-shaped bracket 108. The oppositely disposed sheet-sensing member 124 and its associated link and bellcrank member will be actuated in a similar manner by a sheet in the apparatus and will in turn act in a similar manner to control the opposite end of the actuating rod 137.

The operation of the head return mechanism will now be reviewed briefly. If there is no sheet 36 in the reproducing apparatus then the sheet-sensing fingers 122 and 126 will be disposed in their upper positions so as to project into the path of a sheet, and the spring 142 will hold the bellcrank 132 in its clockwise position whereby the rod 137 will be in engagement with the U-shaped bracket 108. Thus, the rod 137 will hold the U-shaped bracket in its counterclockwise position causing the follower 116 to be positioned with the tooth 118 thereon in operative engagement with the return spiral 98. Assuming that the motor pulley 76 is operating, the spiral 98 will be rotating and the head 88 will thus be in its starting position substantially as shown in FIGURE 2. When a sheet 36 is inserted into the opening 56 in the housing side wall 21 it will pass over the catch-up drive rollers 66 and 68 and will then engage the sheet-sensing fingers 122 and 126. The sheet will depress the fingers 122 and 126 and thereby cause the bellcrank 132 and the oppositely disposed bellcrank (not shown) to be pivoted in a counterclockwise direction. Thus, the actuating rod 137 will be moved downwardly so as to be disengaged from the U-shaped bracket 108, and the bracket will thereby be pivoted to its clockwise position as shown in FIGURE 4 by the tension spring 140 to effect a driving connection between the head assembly 86 and the feed screw 90, the latter being driven by the sheet 36 as previously described.

It will now be understood that whenever a sheet 36 is operatively positioned in the reproducing mechanism, the head assembly 86 will be driven transversely across the sheet by the feed screw 90, and whenever a sheet is reremoved from the apparatus, or is partially ejected through the opening 54 so that the trailing end of the sheet no longer engages the sheet-sensing fingers 122 and 126, the head assembly will automatically be returned to its original position by the return spiral 98. It should be noted that while the sheet-sensing members 120 and 124 are shown mounted on the shaft 60 which carries the catch-up rollers 66 and 68, they may be mounted on a separate shaft or pivot pin means, and the latter arrangement may sometimes be preferred in order to reduce the load on the bearings for the shaft 60.

Automatic sheet ejection mechanism

Referring to FIGURE 5, the previously described pivot pin 114 has an extension 114' which projects laterally from the side of the block 104 and has a conical nose 146. As shown in FIGURE 3, the pin 114' extends toward the right hand housing end wall 23' and is in alignment with an opening 148 formed in the wall. FIGURE 7 shows a bellcrank lever 150 which is pivotally secured to the housing end wall 23' by a pin 151. The bellcrank 150 comprises one arm 152 which extends rearwardly under the opening 148, and a second arm 154 which extends forwardly from the pivot and has a generally horizontal slot 155 formed therein. The arm 152 is bent at its upper edge to form a cam portion 156 (see FIGURE 6) which is adapted to be engaged by the nose 146 on the pin extension 114' when the head assembly 86 reaches the end of its travel. In addition, the gate 50 in the outer guide wall 32 carries a small pin 158 which projects laterally from the end of the gate and extends through a slot 159 in the wall 23' and through the slot 155 in the bellcrank arm 154.

The gate 50 will normally be in its downward or closed position as shown in FIGURE 1 so that a sheet 36 in the reproducing apparatus will be continuously fed through the guide 30. The gate will be biased toward such closed position by gravity, although spring means (not shown) may of course also be provided for this purpose. When the head assembly 86 reaches the end of its travel the nose 146 on the pin extension 114' will project through the opening 148 in the housing wall 23' and will engage the cam surface 156 so as to pivot the bellcrank 150 in a clockwise direction as viewed in FIGURE 7. Accordingly, the bellcrank arm 154 will move upwardly and will thereby lift the pin 158 so as to pivot the gate 50 upwardly to its open position.

It will thus be understood that whenever the head 88 has completely traversed a sheet 36 and has thus reached the end of its travel, the gate 50 will be opened automatically and the leading end of the sheet will be fed out through the opening thus formed in the outer guide wall 32 and through the opening 54 in the housing side wall 21. It is important to note that when the gate 50 is opened the sheet will continue to be driven until the trailing end thereof has passed beyond the drive rollers 62 and 64, whereby the leading end will project outwardly of the reproducer somewhat beyond the opening 54. It will also be noted that a sheet 36 thus positioned will no longer be in engagement with the sheet-sensing fingers 122 and 126, and thus the head assembly 86 will be operatively connected with the return spiral 98 and will thereby be returned to its original position. Manually operable means (not shown) may be associated with the bellcrank lever 150 to permit manual opening of the gate 50 at any time, and whenever the gate is thus opened, regardless of the position of the head assembly 86, the sheet will be at least partially ejected and the head assembly will be returned to its original position.

Sheet changer mechanism

FIGURE 9 shows the reproducing apparatus in conjunction with a sheet changer mechanism 160 for feeding a plurality of sheets 36 to the reproducer one at a time and for ejecting a sheet from the reproducer. The changer 160 comprises a first compartment 162 for storing a plurality of sheets 36 for delivery to the reproducer, and a second compartment 164 for storing sheets 36 which have been ejected from the reproducer. The compartments 162 and 164 may if desired be made in the form of drawers which slide in and out of the changer housing.

The changer 160 includes a top wall 166, a bottom wall 167, and a pair of end walls 168 and 170. There is also provided an intermediate wall member 171 which separates the compartments 162 and 164 and may serve as a shelf for the sheets in the upper compartment. The changer mechanism is disposed immediately adjacent the reproducer apparatus with the right hand side of the changer which is substantially open being adjacent the left hand side wall 21 of the reproducer. The changer 160 is preferably secured to the side of the reproducer in any suitable manner so as to be disposed in fixed relation thereto, and it is adapted to feed sheets 36 one at a time from the upper compartment 162 in through the opening 56 in the reproducer side wall 21, and to receive in the lower compartment 164 sheets which are ejected through the opening 54 in the reproducer side wall. FIGURE 9 shows one of a plurality of dowel pins 161 which are integral with the bottom wall 167 of the changer and extend downwardly into corresponding apertures 163 formed in an extension 163' of the bottom wall of the sheet player for holding the changer and the reproducer in fixed relative position.

The sheet changer 160 is provided with a shaft 172 (see FIGURES 9 and 11) which has its ends journalled in bearings in the changer side walls 168 and 170. The shaft 172 has a pair of kick-out drive rollers 174 and 175 fixedly mounted thereon in spaced relation, and a shaft 176 is disposed beneath the shaft 172 in vertical alignment therewith and carries a pair of pressure rollers 177 which are disposed immediately beneath the rollers 174 and 175 and adapted for engagement therewith. A pulley 178 is carried on the shaft 172 and is disposed outwardly of the changer side wall 168. The pulley 178 is adapted to be rotated in a clockwise direction as viewed in FIGURE 9 (in a manner to be described hereinafter) so as to rotate the rollers 174 and 175 in a similar direction, and it will be understood that due to the engagement between the rollers 174 and 175 and the corresponding pressure rollers 177, the latter will be rotated in a counterclockwise direction.

A pulley 180 is carried on one end of the shaft 176 and is disposed thereon outwardly of the changer side wall 170. When the shaft 176 and pressure rollers 177 are rotated in the manner described hereinabove, the pulley 180 will be rotated therewith in a counterclockwise direction as viewed in FIGURE 9. A shaft 182 extends transversely across the full length of the changer 160 and has its ends journalled in bearings in the side walls 168 and 170. A pulley 184 (see FIGURE 11) is mounted on one end of the shaft 182 and is disposed in substantially the same plane as the pulley 180 so as to be driven thereby through a belt 186. A second pulley 188 is mounted on the shaft 182 at the opposite end from the pulley 184, and it will be seen that when the pulley 180 is rotated in a counterclockwise direction, the shaft 182 and the pulleys 184 and 188 thereon will be rotated in a similar direction. The pulley 188 serves to drive mechanism for feeding sheets from the upper changer compartment 162 into the reproducer, which mechanism will now be described.

A shaft 190 extends the full length of the changer mechanism and its ends project through slots 191 in the housing end walls 168 and 170 and are journalled in a pair of carrier arms 192 and 194. The arms 192 and 194 are pivotally mounted on opposite ends of the shaft 182 whereby the arm 192 is disposed immediately outwardly of the end wall 168 and the arm 194 is disposed immediately outwardly of the opposite end wall 170. It will be seen that the shaft 190 is disposed within the upper changer compartment 162 and is carried by the arms 192 and 194 in such a manner that it is pivotable about the shaft 182 and is thereby adapted to move towards and away from a plurality of sheets 36 stored in the upper compartment. The shaft 190 carries a pair of rollers 196 and 198 which are fixed thereon and adapted to be urged downwardly against the top of a stack of sheets 36 in the upper compartment for feeding one sheet at a time into the reproducing apparatus. The shaft 190 and feed-in rollers 196 and 198 will be urged downwardly against the sheets 36 by gravity, and of course spring means (not shown) may be provided if desired to bias the rollers against the stacks of sheets.

The shaft 190 carries a pulley 200 at one end thereof outwardly of the changer end wall 168. The pulley 200 is disposed substantially in the plane of the pulley 188 and is driven thereby through a belt 202 in such a manner that the rollers 196 and 198 are rotated in a counterclockwise direction. Suitable guide means such as indicated at 204 in FIGURE 9 is provided in order to direct the top sheet 36 from the compartment 162 out of the changer 160 and in through the opening 56 in the wall 21 of the reproducer. It will now be understood that whenever the pulley 178 of the changer mechanism is driven in a clockwise direction in a manner to be described hereinafter, the kick-out rollers 174 and 175 disposed in the lower changer compartment 164 are rotated in a clockwise direction in order to eject a sheet 36 from the reproducer and deposit it in the compartment 164, and the feed-in rollers 196 and 198 disposed in the upper compartment 162 are rotated in a counterclockwise direction in order to feed a sheet 36 from the upper compartment to the reproducer.

FIGURES 9 and 11 show a somewhat modified form of sheet-sensing mechanism wherein the sensing means is disposed adjacent the outside of the sheet 36 as the latter passes through the reproducing apparatus. A shaft 206 extends the full length of the reproducer and the ends thereof are journalled in the housing end walls 23 and 23'. A pair of arms 208 and 209 are fixedly carried on the shaft 206 in spaced relation, and a sheet-sensing roller 210 extends therebetween with one end supported by each of the two arms. A third arm 212 is fixedly carried on one end of the shaft 206 so as to be disposed immediately outwardly of the housing end wall 23' and the arm 212 functions in a manner to be described hereinbelow for controlling the operation of the drive components of the associated changer mechanism 160.

An L-shaped lever 214 is pivotally mounted to the housing end wall 23' at 215 so as to be disposed immediately outwardly of the wall and substantially in the plane of the arm 212. As shown in FIGURE 9, the lever 214 comprises a first arm portion 216 which extends downwardly and to the left from the pivot 215, and a second arm member 218 which is integral therewith and extends upwardly into engagement with the end of the arm 212. A tension spring 220 has one end anchored to the wall 23' by means of a stud 222, and its other end is connected to a lug 224 on the arm 216 so as to bias the L-shaped lever 214 in a clockwise direction about the pivot 215. The upper end of the arm 218 is bent in order to provide a tab 225 which engages the end of the arm 212 and thereby biases the assembly of the shaft 206 and the arms 208, 209 and 212 in a clockwise direction. The sheet-sensing roller 210 is thus biased downwardly into the path of a sheet 36 as shown in FIGURE 9, and it will be understood that when a sheet is operatively positioned in the reproducer it will lift the roller 210 thus pivoting the arm 212 in a counterclockwise direction and thereby moving the L-shaped lever 214 downwardly from the position of FIGURE 9 to the position of FIGURE 10.

An idler pulley 226 is rotatably mounted on the L-shaped lever 214 by a pin 227, and the pulley 226 is disposed in the plane of the reproducer flywheel 74 and the changer pulley 178 so as to be adapted to provide a connection between the drive components of the reproducer and the drive components of the changer. Thus, when the L-shaped lever 214 is in its upward position as shown in FIGURE 9, the idler pulley 226 will engage both the flywheel 74 and the pulley 178 thus causing the latter to be rotated in a clockwise direction to operate the changer drive components in the manner previously described.

However, whenever a sheet 36 is operatively positioned in the reproducer, the lever 214 will be disposed in its downward position as shown in FIGURE 10 so as to disengage the idler wheel 226 and thus disconnect the drive to the changer.

The operation of the sheet changer 160 will now be reviewed briefly. When a sheet 36 is operatively positioned in the reproducer, the changer mechanism 160 will be inoperative. However, when the gate 50 is opened in the manner previously described, the sheet 36 will continue to be driven until the trailing end thereof has passed beyond the drive rollers 62 and 64, at which time the sheet will be positioned substantially as shown in dash lines in FIGURE 9. It will be seen that the forward end of the sheet has passed out through the opening 54 in the side wall 21 of the reproducer and has passed between the kick-out rollers 174 and 175 and the adjacent back-up rollers 177.

The reproducer drive rollers 62 and 64 will feed the leading edge of the sheet into the kick-out rollers 174 and 175, and approximately at the same time the trailing end of the sheet will leave the sheet-sensing roller 210 so as to initiate the operation of the changer drive components. Thus, the kick-out rollers 174 and 175 will be actuated to drive the played sheet 36 into the changer compartment 164, and simultaneously therewith the feed-in rollers 196 and 198 will be actuated in order to feed a new sheet 36 into the reproducer.

It should be understood that while two types of sheet-sensing means have been described herein, only one need be employed in a given reproducer, and whichever sheet-sensing means is selected, it should be connected both to the L-shaped lever 214 in order to control the changer drive, and also to the rod 137 in order to actuate the follower 116 and thereby control the drive for the head assembly 86. Any suitable linkage means may be utilized to connect the sheet-sensing means shown in FIGURE 9 with the actuating rod 137. For example, there is shown a lug 228 formed on the arm 216, and a slot 230 is provided in the housing end wall 23' so as to permit the actuating rod 137 to project through the slot for connection with the lug. In order to control the opposite end of the rod 137, an arm substantially identical to the arm 212 may be mounted at the opposite end of the shaft 206 adjacent the opposite housing end wall 23, and a lever substantially identical to the lever 214 but without an idler pulley thereon may be associated therewith and with the rod 137 in the manner described above. Thus, when a sheet 36 is present in the reproducer, the L-shaped lever 214 will be moved downwardly and the rod 137 will be moved away from the bracket 108 (see FIGURE 4), and when a sheet is ejected from the reproducer the lever 214 will be moved upwardly and the rod 137 will move upwardly therewith to engage the bracket 108 and thereby cause the head assembly 86 to be returned to its original position in the manner described earlier herein.

While I have illustrated my invention in certain preferred forms, other modifications coming within the scope of my invention will be readily suggested to others with my disclosure before them.

I claim:

1. In a magnetic reproducing device adapted to handle records in the form of sheets of magnetic material, the combination of guide means comprising inner and outer guide walls for guiding a sheet through a convolute path of travel, an opening in said outer guide wall to permit ejection of the sheet, gate means normally closing said opening so that said sheet will move continuously between said guide walls through said path and pivotal to an open position to permit ejection of a sheet, magnetic head assembly, drive means for moving said head assembly transversely across a sheet in playing position in order to play said sheet, gate opening means for pivoting said gate to an open position to permit ejection of a sheet, and means carried on said head assembly for actuating said gate opening means upon the completion of the transverse movement of said head assembly across said sheet, said means carried on said head assembly comprising a pin which extends generally horizontally from said head assembly and wherein said gate opening means comprises a pivotal lever which has one end associated with said gate means and its other end positioned to be engaged by said pin.

2. A device as claimed in claim 1 further including first storage means for storing a plurality of sheets, a feed-in drive associated with said first storage means for engaging the sheets therein and feeding them one at a time to said guide means through a provided inlet opening therein, and second storage means for storing played sheets which are ejected through said ejection opening.

3. The combination claimed in claim 1, further including storage means adjacent said opening for receiving played sheets which are ejected through said opening upon opening of the gate means, and a kick-out drive associated with said storage means for engaging sheets which are ejected through said outlet opening and driving them into the storage means.

4. For use with magnetic reproducing apparatus adapted to handle a record in the form of a sheet of magnetic material, the improvement comprising, in combination, reproducing means for moving a sheet through a convolute path of travel and a magnetic head movable transversely of said convolute path of travel for playing the same, said reproducing means having an inlet opening to permit entry of a sheet to be played and an outlet opening to permit ejection of a played sheet, first storage means for storing a plurality of sheets for delivery one at a time to said inlet opening, second storage means for storing played sheets which are ejected through said outlet opening, a feed-in drive associated with said first storage means for engagement of sheets therein and feeding them one at a time to said inlet opening, sheet-sensing means positioned in said convolute path of travel between the inlet and said magnetic head for sensing the presence of a sheet in playing position in said reproducing means, and means responsive to said sheet-sensing means which actuate said feed-in drive only when a sheet is not disposed in playing position in said reproducing means.

5. The combination claimed in claim 4 wherein the sheet-sensing means is located immediately adjacent the inlet opening.

6. The invention of claim 4 wherein said sheet-sensing means comprises at least one sensing member which is biased toward a position wherein it is disposed in the path of a sheet in playing position and which is movable out of said path upon engagement by said sheet.

7. A device as claimed in claim 4 further comprising a kick-out drive associated with said second storage means for engaging sheets which are ejected through said outlet opening and driving them into said second storage means and wherein said means responsive to said sheet-sensing means simultaneously actuates said feed-in drive and said kick-out drive whereby when a sheet is disposed in playing position in said reproducing means said feed-in drive and kick-out drive will be inoperative and when a sheet is not disposed in playing position in said reproducing means said feed-in drive and kick-out drive will be actuated to deliver a new sheet to the reproducing means simultaneously with the delivery of an ejected sheet into said second storage means.

8. A device as claimed in claim 7 wherein said feed-in drive comprises at least one drive roller adapted to engage the top of a stack of sheets in said first storage means, said kick-out drive includes at least one drive roller; and said sheet-sensing means comprises at least one sensing member which is biased toward a position wherein it is disposed in the path of a sheet in playing position and which is movable out of said path upon engagement by said sheet.

9. For use with magnetic reproducing apparatus adapted to handle a record in the form of a sheet of magnetic material, the improvement comprising, in combination, reproducing means for moving a sheet through a convolute path of travel and playing the same, said reproducing means having an inlet opening to permit entry of a sheet to be played and an outlet opening to permit ejection of a played sheet, first storage means for storing a plurality of sheets for delivery one at a time to said inlet opening, second storage means for storing played sheets which are ejected through said outlet opening, a feed-in drive associated with said first storage means for engaging the sheets therein and feeding them one at a time to said inlet opening, sheet-sensing means for sensing the presence of a sheet in playing position in said reproducing means, and means responsive to said sheet-sensing means which actuate said fed-in drive whereby when a sheet is disposed in playing position in said reproducing means said feed-in drive will be inoperative and when a sheet is not disposed in playing position in said reproducing means said feed-in drive will be operated, a kick-out drive associated with said second storage means for engaging sheets which are ejected through said outlet opening and driving them into said second storage means and wherein said means responsive to said sheet-sensing means simultaneously actuates said feed-in drive and said kick-out drive whereby when a sheet is disposed in playing position in said reproducing means said feed-in drive and kick-out drive will be inoperative and when a sheet is not disposed in playing position in said reproducing means feed-in drive and kick-out drive will be actuated to deliver a new sheet to the reproducing means simultaneously with the delivery of an ejected sheet into said second storage means, and reproducer drive means associated with said reproducing means for moving a sheet therethrough, and changer drive means interconnecting said feed-in drive and kick-out drive for simultaneous operation and wherein said means responsive to said sheet-sensing means connects said reproducer drive means with said changer drive means for operating said feed-in drive and kick-out drive from said reproducer drive.

10. The invention of claim 9 wherein said feed-in drive includes at least one drive roller adapted to engage the top of a stack of sheets in said first storage means for feeding one sheet at a time to said inlet opening and said kick-out drive includes at least one drive roller for engaging sheets which are ejected through said outlet opening and driving them into said second storage means, and wherein said sheet-sensing means comprises at least one sensing member which is biased towards a position wherein it is disposed in the path of a sheet in playing position and which is movable out of said path upon engagement by said sheet.

11. For use with magnetic reproducing apparatus adapted to handle a record in the form of a sheet of magnetic material, the improvement comprising, in combination, reproducing means for moving a sheet through a convolute path of travel and playing the same, said reproducing means having an inlet opening to permit entry of a sheet to be played and an outlet opening to permit ejection of a played sheet, first storage means for storing a plurality of sheets for delivery one at a time to said inlet opening, second storage means for storing played sheets which are ejected through said outlet opening, a feed-in drive associated with said first storage means for engaging the sheets therein and feeding them one at a time to said inlet opening, sheet-sensing means for sensing the presence of a sheet in playing position in said reproducing means, and means responsive to said sheet-sensing means which actuates said feed-in drive whereby when a sheet is disposed in playing position in said reproducing means said feed-in drive will be inoperative and when a sheet is not disposed in playing position in said reproducing means said feed-in drive will be operated, said reproducing means including guide means, a magnetic head assembly movable across the sheets' travel path from an initial position and back thereto, first head drive means adapted to be operatively associated with said head assembly for moving the same at a predetermined speed in a first direction transversely across a sheet in playing position in order to play said sheet, second head drive means adapted to be operatively associated with said head assembly for moving the same opposite to said first direction at a speed greater than said predetermined speed in order to return said head assembly to its initial position and wherein said means responsive to said sheet sensing means for actuating said feed-in drive is further responsive for associating said head assembly with a given one of said first and second head drive means whereby when a sheet is disposed in playing position in said reproducing means said head assembly will be associated with said first head drive means and when a sheet is not disposed in playing position in said reproducing means said head assembly will be associated with said second head drive means.

12. A device as claimed in claim 11 further comprising gate means normally closing said outlet opening so that said sheet will move continuously through said path and means responsive to the completion of the transverse movement of said magnetic head assembly in said first direction for opening said gate to permit ejection of a sheet.

13. The invention of claim 11 further comprising a kick-out drive associated with said second storage means for engaging sheets which are ejected through said outlet opening and driving them into said storage means and wherein said means responsive to said sheet-sensing means simultaneously actuates said feed-in and said kick-out drive whereby when a sheet is disposed in playing position in said reproducing means, said feed-in drive and kick-out drive will be inoperative and when a sheet is not disposed in playing position in said reproducing means said feed-in drive and kick-out drive will be operated to deliver a new sheet to the reproducing means simultaneously with the delivery of an ejected sheet into said second storage means.

14. The invention of claim 13 wherein said sheet-sensing means comprises at least one sensing member which is biased towards a position wherein it is disposed in the path of a sheet in playing position and which is movable out of said path upon engagement by said sheet.

15. A device as claimed in claim 13 further comprising gate means normally closing said outlet opening so that said sheet will move continuously through said path, means for opening said gate to permit ejection of a sheet and means carried on said head assembly for actuating said gate opening means upon the completion of the transverse movement of said head assembly in said first direction.

16. In magnetic reproducing apparatus adapted to handle records in the form of sheets of magnetic material, the combination comprising a housing having guide means for moving a sheet in an endless path of travel during reproducing of said sheet, one wall of said housing including spaced inlet and outlet openings communicating with said guide means, a container readily separable from said housing including first and second storage chambers, said first storage chamber being alignable with said inlet opening for delivering a sheet through said inlet opening into said guide means and said second storage chamber being alignable with said outlet opening for receiving sheets which have been ejected through said outlet, said readily separable container containing feed means for delivering one sheet at a time from said first storage chamber through said inlet opening and for withdrawing reproduced sheets from said outlet means to said second storage chamber and further including a clutch wheel which is operatively connected to said feed means, said apparatus further comprising a drive member which is positioned for actuation of said clutch wheel when said container is assembled with said housing and means for operating said drive member to actuate said clutch wheel at the end of reproducing of a sheet in order to effect delivery of a new sheet from said first storage means through said inlet opening and withdrawal of the reproduced sheet from said outlet means to said second storage chamber.

References Cited

UNITED STATES PATENTS

| | | | |
|---|---|---|---|
| 2,966,357 | 12/1960 | Fritzinger ---------- | 274—4.2 |
| 2,946,593 | 7/1960 | Beyer -------------- | 274—4 |

FOREIGN PATENTS

| | | |
|---|---|---|
| 876,557 | 9/1961 | Great Britain. |
| 262,595 | 6/1949 | Switzerland. |

LEONARD FORMAN, Primary Examiner

STEVAN L. STEPHAN, Assistant Examiner

U.S. Cl. X.R.

179—100.2; 274—4, 11